United States Patent
Rudowicz et al.

(10) Patent No.: US 7,418,040 B2
(45) Date of Patent: Aug. 26, 2008

(54) METHOD AND APPARATUS FOR DETERMINING A TIMING OFFSET FOR PROCESSING A MULTI-CARRIER SIGNAL

(75) Inventors: Michael J. Rudowicz, Lake Worth, FL (US); Stephen S. Shiao, Coral Springs, FL (US); Patrick J. Doran, Fairfax, VA (US)

(73) Assignee: Motorola, Inc., Schaumburg, IL (US)

( * ) Notice: Subject to any disclaimer, the term of this patent is extended or adjusted under 35 U.S.C. 154(b) by 677 days.

(21) Appl. No.: 10/449,404

(22) Filed: May 30, 2003

(65) Prior Publication Data

US 2004/0240569 A1    Dec. 2, 2004

(51) Int. Cl.
  *H04K 1/10*    (2006.01)
  *H04L 27/28*    (2006.01)
(52) U.S. Cl. .................. 375/260; 375/325; 375/326; 375/327; 375/342; 375/343
(58) Field of Classification Search ............. 375/130, 375/131, 136, 140, 141, 142, 143, 147, 150, 375/152, 316, 340, 343, 346, 354, 355, 362, 375/364, 365, 366, 260, 325, 326, 327, 342
See application file for complete search history.

(56) References Cited

U.S. PATENT DOCUMENTS

| | | | | |
|---|---|---|---|---|
| 5,748,686 A | * | 5/1998 | Langberg et al. | 375/367 |
| 5,757,845 A | * | 5/1998 | Fukawa et al. | 375/152 |
| 5,778,022 A | * | 7/1998 | Walley | 375/152 |
| 5,867,478 A |  | 2/1999 | Baum et al. | 370/203 |
| 6,304,611 B1 | * | 10/2001 | Miyashita et al. | 375/260 |
| 6,314,148 B1 | * | 11/2001 | Fulghum | 375/355 |
| 6,430,148 B1 | * | 8/2002 | Ring | 370/208 |
| 6,539,063 B1 | * | 3/2003 | Peyla et al. | 375/267 |
| 6,628,606 B1 | * | 9/2003 | Hong et al. | 370/208 |
| 6,754,170 B1 | * | 6/2004 | Ward | 370/208 |
| 7,012,949 B2 | * | 3/2006 | Uesugi | 375/130 |
| 7,058,151 B1 | * | 6/2006 | Kim | 375/355 |
| 2002/0061080 A1 | * | 5/2002 | Richards et al. | 375/346 |

* cited by examiner

*Primary Examiner*—Phuong Phu

(57) ABSTRACT

A receiver 200 as a component in a wireless communication device 100 and a corresponding method are used for receiving a multi-carrier communication signal and determining a timing offset thereof. The receiver 200 comprises a controller 222 to perform a correlation on each of a plurality of sub-carriers comprising the multi-carrier signal to provide a plurality of timing offsets. A quality metric corresponding to each of the plurality of timing offsets may be employed to select the best timing offset. Alternatively, a set of timing offsets whose quality metric exceed a threshold may be averaged. Either the best or average timing offset is used for processing all the sub-carriers of the multi-carrier signal.

18 Claims, 4 Drawing Sheets

METHOD AND APPARATUS FOR DETERMINING A TIMING OFFSET FOR PROCESSING A MULTI-CARRIER SIGNAL

FIELD OF THE INVENTION

This invention relates in general to communication systems using a carrier comprising multiple sub-carriers and more specifically to a method and apparatus for determining a timing offset for processing the sub-carriers.

BACKGROUND OF THE INVENTION

Radio communications systems that use multiple sub-carriers to broadcast multiple signals exist. These systems are often referred to as multi carrier frequency domain multiple access (multi carrier FDMA) systems and they split the available bandwidth into separate sub-carriers. Each sub-carrier can be used to broadcast a separate message. The messages on the separate sub-carriers may be intended for separate receivers. The sub-carriers may also be used together to improve the quality of the signal or increase the effective data rate or bandwidth available to one receiver. One step in receiving the message contained in a sub-carrier is determining a timing offset for locating the start of the message. Where a message on multiple sub-carriers is intended for a single receiver, the receiver must determine the timing offset to use in decoding each of the sub-carriers. Current methods evaluate a timing offset for a sub-carrier and use that offset for all other sub-channels. This approach can suffer from a lack of accuracy that is needed to assure that all sub-carriers are received with sufficient integrity. Clearly a need exists for improved methods and apparatus for determining a timing offset for processing a multi-carrier signal.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview, the present disclosure concerns communications systems that employ multi carrier frequency domain multiple access, e.g. systems that use a signal comprising a plurality of sub-carriers. More particularly, various inventive concepts and principles embodied in methods, receivers, and other apparatus for the determination of a timing offset in a data stream are discussed. The communications systems of particular interest include, for example, Integrated Digital Enhanced Network systems and corresponding communications units, available from Motorola, Inc.

As further discussed below various inventive principles and combinations thereof are advantageously employed to allow more accurate and flexible selection of timing offsets used for decoding the messages contained in each of the sub-carriers of a multi-carrier signal provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs or ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
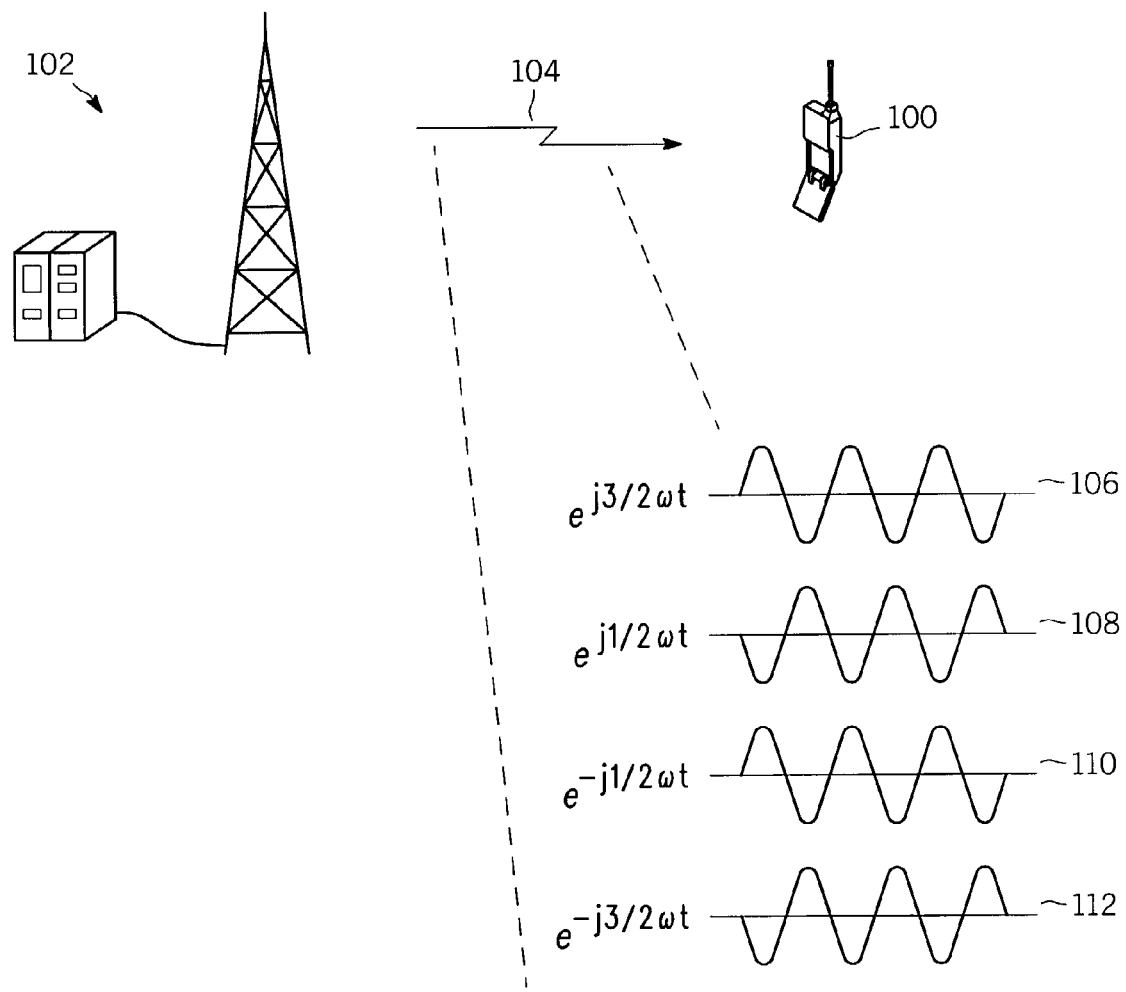
FIG. 1 depicts, in a simplified and representative form, a block diagram of a communications system showing a multi-carrier signal broadcast to a wireless communication device.

Referring to FIG. 1, a simplified and representative block diagram of a communications system showing a multi-carrier signal transmitted to a wireless communication device will be discussed and described. The wireless communication device 100 is communicating within a radio communication system further comprising a base station that includes a transmitter 102. The base station, specifically transmitter 102 broadcasts a signal 104 to the wireless communication device 100. The signal 104 comprises a plurality of sub-carriers 106, 108, 110, 112. In an exemplary embodiment, the signal 104 may be a 100 KHz bandwidth signal and each of the sub-carriers 106, 108, 110, 112 each 25 KHz in bandwidth, including a guard band. The sub-carriers may be modulated with orthogonal phases, for example a 16 QAM modulation having sub-carrier 106 with phase $e^{j3/2\omega t}$, sub-carrier 108 with phase $e^{j1/2\omega t}$, sub-carrier 110 with phase $e^{-j1/2\omega t}$, sub-carrier 112 with phase $e^{-j3/2\omega t}$, where the frequency of the respective sub-carriers varies by 25 KHz between adjacent sub-carriers. A characteristic of such systems is that the transmitter 102 uses a single clock to drive the modulation of each sub-carrier. Therefore, all sub-carriers are synchronized to each other from a timing perspective, i.e. a sub-carrier data stream will have identical or nearly identical starting times compared to the other sub-carriers. This trait is advantageously used in the receiver 200 of FIG. 2 to improve the accuracy of timing offsets or estimations thereof.

Frequency Division Multiple Access (FDMA) systems may utilize multiple sub-carriers to send a single message with each of the sub-carriers having a separate synchronization signal. No timing information is sent along with each sub-carrier, so the designated receiver must employ another method to determine timing of the start of the message segment on each of the sub-carriers. In one embodiment, an FDMA multi-carrier system may employ a sub-carrier modulation scheme where each message is sent in a Time Division Multiple Access (TDMA) timeslot, with each timeslot being approximately 15 milliseconds in duration. The message may be divided into two segments, a synchronization waveform and a data waveform. The synchronization waveform may be shorter and broadcast at the beginning of a timeslot, for example, 3 symbols of synchronization waveform followed by 57 symbols of data or message waveform, giving a total of 60 symbols in a timeslot. The 3 synchronization waveform symbols may be from a set of 12 synchronization waveform symbols chosen to have low cross-correlation and to be real valued, as opposed to complex, to reduce computational requirements. The synchronization waveforms may be further chosen to have low side lobes compared to the main lobe to give improved correlation results. The contents of the data waveform may represent speech, text, or other binary information, such as a digital image.

The wireless communication device 100 must be able to process the synchronization waveform to determine a timing offset of the signal. Missing the synchronization waveform or incorrectly identifying the timing offset will result in the loss of information from the corresponding data waveform. In one embodiment, improved identification of the correct timing offset can be achieved when the wireless communication device 100 and its wireless receiver 200 are arranged and operate as described below.

The wireless communication device 100 can be a typical cellular telephone or handset such as those available from manufacturers, such as Motorola. One such handset, commonly referred to as the model i95, can advantageously utilize the principles and concepts herein when enhanced as described in the following disclosure. The transmitter 102 is common to communications infrastructure systems similar to Integrated Digital Enhanced Network equipment available from Motorola.

Figure 2:
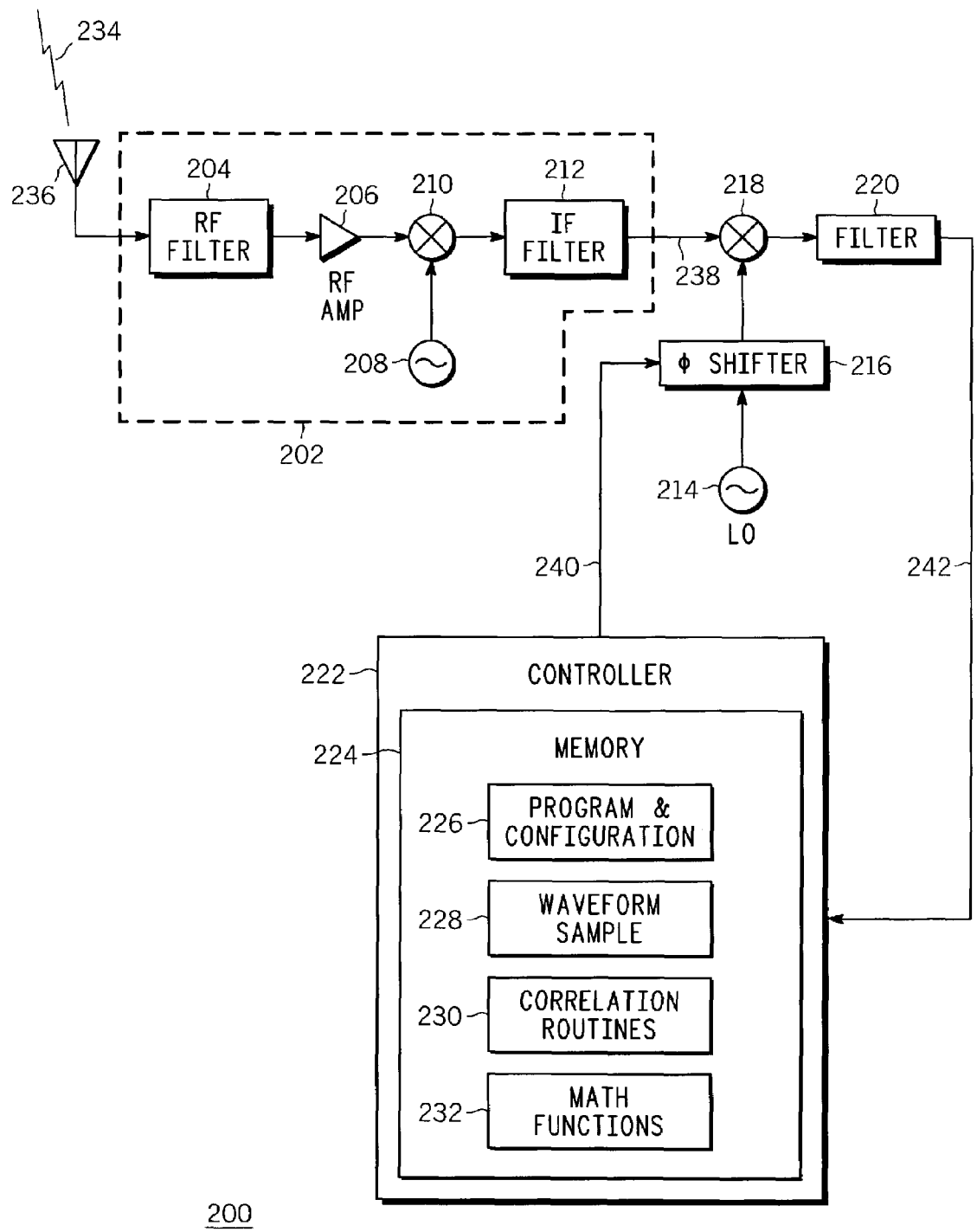
FIG. 2 depicts, in a simplified and representative form, a block diagram of a receiver for determining a timing offset for processing a multi-carrier signal.

Referring to FIG. 2, a simplified and representative block diagram of a receiver for determining a timing offset for processing a multi-carrier signal will be discussed and described. The receiver 200 is a component of the wireless communication device 100 and is comprised of several major elements. One such element is a front end 202. The front end comprises a radio frequency filter 204, for limiting the energy entering the front end 202 to a specific frequency range. An amplifier 206 increases the level or amplitude of the filtered signal. A signal source 208 provides an injection signal to a mixer 210 where the incoming signal is mixed or down converted to a lower frequency and further filtered by an intermediate frequency filter 212. In the case of a direct conversion receiver, the output of the front end 202 is at a baseband frequency. In the case of a two stage receiver, the output of the front end 202 is at an intermediate frequency such as 13.7 MHz. The receiver 200 further comprises a second mixing stage composed of a second signal source 214 providing a signal to a phase shifter 216 for use by a mixer 218. The output of the mixer feeds a filter 220, for further limiting the energy of the signal outside a desired frequency range. The filter 220 is coupled to a controller 222. The controller may be capable of multiple functions and may contain a digital signal processor or analog to digital converters. The controller 222 may also comprise a memory 224 for storing an operating program, configuration data and intermediate results 226, sample waveforms 228 for use in correlation operations, the correlation routines 230, and other math functions 232. The block diagram thus depicted is representative of the functions performed. In some embodiments the second mixer 218 and its associated components may be included in or functionally performed by the controller 222.

The structural elements of the wireless receiver 200 are generally known and available and may be modified to operate and function in accordance with the inventive principles and concepts disclosed herein. The signal source 208 may be, for example, a fractional-N synthesizer. The mixers 210 and 218, filters 204, 212, 220, amplifier 206, phase shifter 216, are all commercially available and known in the art. In the exemplary case where the controller 222 is or includes a DSP, various devices are known and available from manufacturers such as Motorola, Inc. The memory 224, comprising volatile and non-volatile memory, if not integral to the controller, is also commercially available and known. When functions of the controller 222 are implemented in hardware a number of commercially available field programmable gate arrays or the like are suitable for performing the tasks, given the principles and concepts disclosed herein. Implementing a DSP task in logic hardware is known in the art and can be accomplished by one of ordinary skill in the art without undue experimentation given the discussion and explanations herein.

In operation, the receiver 200 is arranged for receiving a communication signal 234 via the antenna 236 and determining a timing offset for use in processing the received signal. The front end 202 receives the communication signal comprising a plurality of sub-carriers 106, 108, 110, 112. The communication signal is down-converted in the front end 202. The output 238 of the front end 202 is provided to a second mixer 218. The controller 222 provides a signal 240 to a phase shifter 216 for adjusting the injection frequency output of the second signal source 214. Each sub-carrier may be modulated using QPSK, 16-QAM or 64 QUAM modulation and may be demodulated using the phase shifted injection signal. In one embodiment, the output 238 of the front end 202 is a 100 kilohertz (KHz) bandwidth signal comprising four 25 KHz sub-carriers 106, 108, 110, 112 including a guard band of 7 KHz. The controller 222 is coupled to the front end by and in one embodiment as above noted includes or implements the second mixer 218 and filter 220.

The controller 222 samples the down-converted signal at the filter output 242, for example, capturing 36,000 samples per second of the down-converted signal over a given sampling period. The samples are used to construct a digital representation of the down-converted signal 242 representing each of the sub-carriers. The down-converted signal may comprise a synchronization waveform and a data or message waveform for each sub-carrier. A timing offset is required for determining where the starting symbol is in a stream of message symbols. Recalling that the sub-carriers originate in the same transmitter, the assumption can be made that the starting symbol of the timeslot is at the same point or referenced to the same time frame in each of the sub-carriers 106, 108, 110, 112. The controller 222 is able to determine a timing offset for each of the plurality of sub-carriers as explained further below. The controller 222 samples each of the sub-carriers 106, 108, 110, 112 and processes these respective samples to provide a plurality of timing offsets or timing offset estimates. The controller 222 then analyzes each of the plurality of timing offsets and selects a first timing offset for use in processing the message waveform of each of the plurality of sub-carriers.

The controller 222 can determine a metric for each of the plurality of timing offsets to provide a plurality of metrics. The metric corresponds to the accuracy of the timing offset and may be used for determining the timing offset (first timing offset) used for further processing the plurality of sub-carriers 106, 108, 110, 112. In one embodiment, the controller 222, after analyzing the metrics corresponding to each of the timing offsets may select the timing offset determined to be the most accurate, that is, having the best metric. In another embodiment, the first timing offset may correspond to an average of two or more timing offsets from the plurality of timing offsets, preferably whose corresponding metric exceeds a threshold. The threshold is a minimum quality level determined to be acceptable for the use of corresponding timing offset in the averaging process. The threshold may span a range of values based on local conditions and is empirically derived but does not involve undue experimentation for determining an appropriate value.

In more detail for each sub carrier, the controller 222 performs a correlation between the synchronization waveform and a known waveform 228 using the correlation routines 230 to give a first result. This is also known as a matched filter. The expression for the matched filter correlation routine 230 is given by $$\chi(n) = \sum_{l=0}^{L-1} c_s(l) u(n-1)$$

Where $c_s$ represents the synchronization waveform of length L samples and u represents the filtered mixer output signal at 242 as converted to a digital representation. The controller 222 then further processes this first result by differentiating a function corresponding to the first result to give a second result. In one embodiment the function takes the square of the magnitude of the output of the correlation function. This serves to remove the effects of received signal phase offsets that can be generated in the transmission process. A representative output of the differentiation process is given by:

$$\xi(n) = \sum_{l=0}^{N-1} c_d(l) |\chi(n-l)|^2$$

Where $c_d$ is the impulse response of the differentiator of length N. The output of the differentiator, combined with the known processing group delay, gives an estimate of the time delay between the zero crossing event associated with the correlation peak and the center of the pulse-shaping process. This estimate is defined as:

$$\Delta_{diff} = \Delta_{peak} + \Delta_{cr} - \Delta_{psf}$$

The differentiation process allows the use of a zero crossing detector to determine the maximum point of the correlation corresponding to the timing offset for a given sub-carrier.

An estimate of the time of the occurrence of the zero crossing event associated with the correlation peak $\tau_{cr}$ is calculated using:

$$\tau_{cr} = n_{cr} - 1 + \frac{\xi(n_{cr} - 1)}{\xi(n_{cr} - 1) + |\xi(n_{cr})|},$$

where $n_{cr}$ is the sample corresponding to the occurrence of the zero crossing.

The sub-carrier timing offset estimate (given in samples) is obtained by: $\tau_{sp} = \tau_{cr} - \Delta_{diff}$. This gives the timing offset for each sub-carrier. This process is repeated for each sub-carrier.

Each time a sub-carrier timing offset is calculated, a corresponding metric may be calculated. The controller 222 compares the magnitude squared of the matched filter output to a measure of energy of the synchronization waveform to determine the metric. The measure of energy is a sum of a magnitude squared of the samples of the synchronization waveform adjusted by a predetermined value. The predetermined value is selected to give a value near 1 when a strong correlation result is output from the matched filter. In some cases, a particular sub-carrier may not have a strong result from the matched filter and the metric will fall below the threshold value. When this occurs, the controller 222 can still use the selected or determined or first timing offset to process the message waveform.

In another embodiment, the controller 222 may be separated from the remainder of the receiver 200. In this case, the controller 222 is used to determine a timing offset for processing the multi-carrier signal at 242 and comprises an input coupled to the multi-carrier signal at 242 where this signal comprises the plurality of sub-carriers 106, 108, 110, 112. The controller 222 further comprises a correlator for processing each sub-carrier to determine a plurality of timing offsets, with one timing offset corresponding to each of the plurality of sub-carriers. The controller 222 also comprises a selector for selecting a first timing offset from a plurality of timing offsets for use in processing each of the plurality of sub-carriers. The correlator comprises a matched filter, a first multiplier for providing a magnitude squared of an output of the matched filter, a differentiator, and a zero crossing detector each or all as discussed above.

The controller 222 may also comprise a metric calculator to determine a metric for each of the plurality of timing offsets to provide a plurality of metrics, where the metric corresponds to the accuracy of the timing offset as earlier noted. The controller can select the first timing offset corresponding to a best metric from the plurality of metrics. In an alternate configuration, the controller 222 can determine the first timing offset corresponding to an average of two or more timing offsets each having a metric exceeding a threshold from the plurality of timing offsets. In another embodiment the controller may dynamically select whether to use a timing offset having a high or best metric or an average timing offset.

The metric calculator may comprise a second multiplier, an accumulator, an amplifier, and a threshold comparator. Each of the plurality of sub-carriers preferably comprises a synchronization waveform and a message waveform. The magnitude squared of the output of the matched filter is provided to the threshold comparator and corresponds to a correlation value of the synchronization waveform and a known waveform. The second multiplier, the accumulator and the amplifier provide an average energy of the synchronization waveform to the threshold comparator. The measure of energy is a sum of a magnitude squared of the samples of the synchronization waveform adjusted by a predetermined value. The predetermined value is selected to give a value near 1 when a strong correlation result is output from the matched filter. The threshold comparator comprises an analog output for providing the metric corresponding to the correlation value and the average energy of the synchronization waveform.

Figure 3:
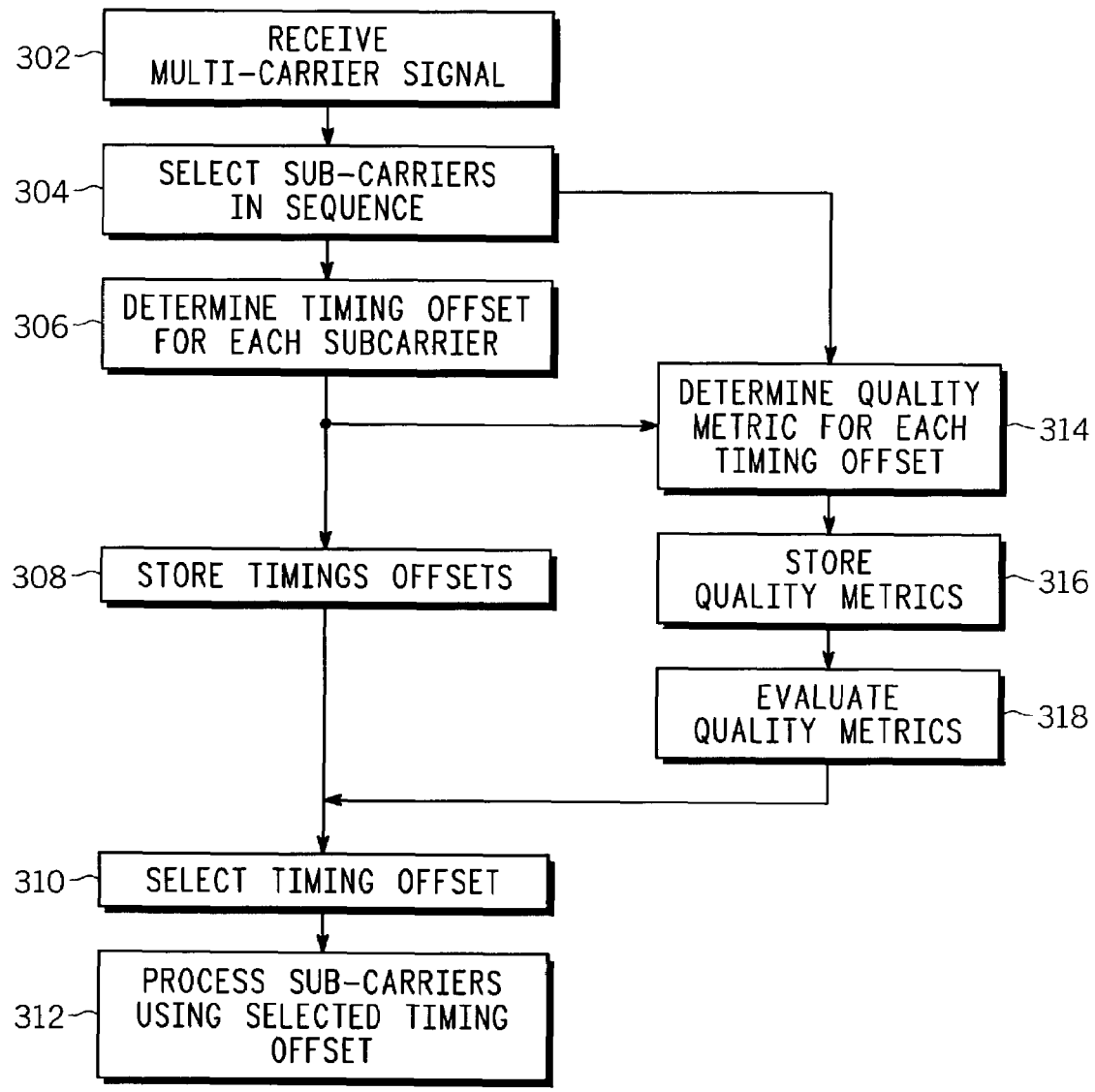
FIG. 3 is a method for determining a timing offset for a multi-carrier signal.

Referring to FIG. 3, a flow chart for a method for determining a timing offset for a multi-carrier signal will be discussed and described. A multi-carrier signal is provided 302. The multi-carrier signal comprises a plurality of sub-carriers, each of the plurality of sub-carriers having a synchronization waveform and a message waveform. In sequence, each sub-carrier is selected 304 for processing.

A timing offset for each of the plurality of sub-carriers is determined 306 to provide a plurality of timing offsets and the results are stored 308. A first timing offset corresponding to the plurality of timing offsets is selected 310 and used for processing 312 the message waveform of each of the plurality of sub-carriers.

A result or timing offset from 306 and the sub-carrier signal from 304 are provided for determining 314 a quality metric for each timing offset to provide a plurality of quality metrics. The plurality of quality metrics are stored 316. The plurality of quality metrics are analyzed 318 with the results used for selecting 310 the first timing offset. The analysis 318 may result in selecting the first timing offset having the best quality metric. In another embodiment, the analysis 318 may result in selecting the first timing offset corresponding to an average of two more timing offsets whose corresponding quality metric exceeds a threshold.

Figure 4:
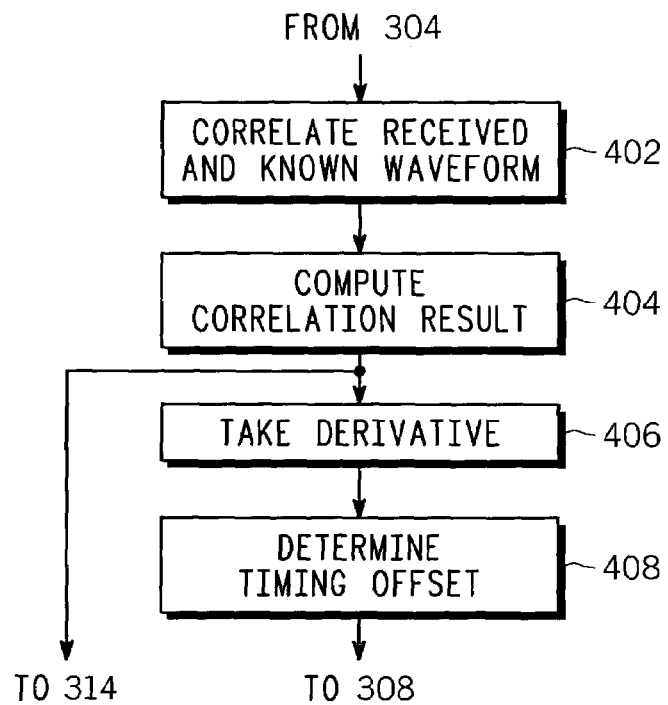
FIG. 4 shows additional detail for a portion of the method of FIG. 3.

Referring to FIG. 4, a more detailed view of a portion of the method of FIG. 3 will be discussed and described. Following from 304, a correlation 402 is performed between the synchronization waveform of each of the plurality of sub-carriers 106, 108, 110, 112 with a known waveform 228 where the known waveform is the expected synchronization waveform. The output of 402 is further processed by computing 404 a function corresponding to a result of the correlating to give a correlation result. This may be, for example, taking the magnitude squared of the correlation at 402. The correlation result is differentiated 406, specifically peaks in the correlation result are converted to zero crossings, and a detector, for example, a zero crossing detector is used to give the timing offset. The result of 408 is provided to 308. The intermediate result of 404 is provided to 314.

Figure 5:
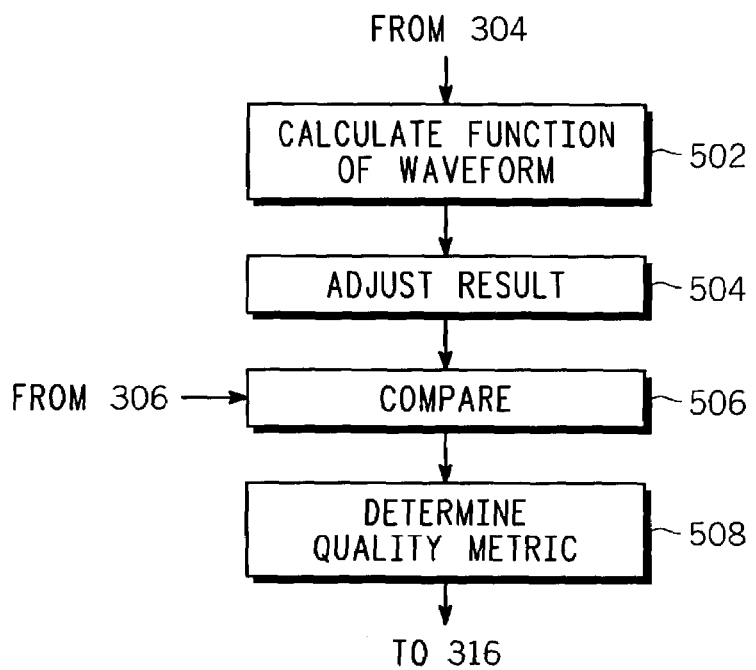
FIG. 5 depicts further detail for a portion of the method of FIG. 3.

Referring to FIG. 5, additional detail of the method of FIG. 3 is discussed and described. Following from 304 a function is calculated 502 corresponding to a set of samples of the synchronization waveform to give an energy total for each sub-carrier. An adjustment 504 is made to the energy total using a predetermined factor or scaling factor to give an adjusted result. The adjustment is made in one embodiment to provide the final quality metrics in a range of 0 to less than 1. The adjusted result of 504 is compared 506 to the correlation result 306. The quality metric is determined 508 and provided to 316. The quality metric is determined by performing a division of the magnitude-squared value of the correlation result $|\chi(n)|^2$ by the adjusted energy total. The value of the computed metric is within the range 0 to less than 1.

The methods and apparatus discussed above, and the inventive principles thereof are intended to and will alleviate problems caused by prior art timing offset determination for message symbol synchronization. Using these principles described above for selecting a value for timing offset will improve the accuracy of the timing offset estimation and thereby improve the quality of the decoded signal. Rather than use any timing offset for any sub-carrier, a more accurate value is found and used for further processing of a multi-carrier signal. This will significantly improve the data recovery from the sub-carriers employing these techniques.

Various embodiments of methods and apparatus for measuring and selecting a timing offset have been discussed and described. It is expected that these embodiments or others in accordance with the present invention will have application to many communication systems that employ multi-carrier transmissions without separate synchronization channels. The disclosure extends to the constituent elements or equipment comprising such systems and specifically the methods employed thereby and therein. Using the inventive principles and concepts disclosed herein advantageously allows or provides for more accurate data recovery in multi carrier FDMA systems which will be beneficial to users and system operators alike.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A receiver for receiving a communication signal and determining a timing offset thereof comprising:
   a front end for receiving the communication signal, the communication signal comprising a plurality of sub-carriers, each of the plurality of sub-carriers having a synchroniztion waveform and a message waveform; and
   a controller coupled to the front end to determine a timing offset for each of the plurality of sub-carriers to provide a plurality of timing offsets and to select a first timing offset corresponding to the plurality of timing offsets to process each of the plurality of sub-carriers.
   wherein the controller, for each of the plurality of sub-carriers:
      performs a correlation between the synchronization waveform and a known waveform to give a first result;
      differentiates a function corresponding to the first result to give a second result; and
      uses a detector to analyze the second result to determine the timing offset.

2. The receiver of claim 1 wherein the controller determines a metric for each of the plurality of timing offsets to provide a plurality of metrics, the metric corresponding to an accuracy of the timing offset.

3. The receiver of claim 2 wherein the first timing offset corresponds to the timing offset having the best metric.

4. The receiver of claim 2 wherein the first timing offset corresponds to an average of two or more timing offsets from the plurality of timing offsets whose corresponding metric exceeds a threshold.

5. The receiver of claim 2 wherein each of the plurality of sub-carriers comprises a separated by a guard band.

6. The receiver of claim 1 wherein the controller divides a magnitude squared of the first result by a measure of energy of the synchronization waveform to determine the metric for each of the plurality of timing offsets.

7. The receiver of claim 6 wherein the measure of energy is a sum of a magnitude squared of samples of the synchronization waveform adjusted by a predetermined value.

8. The receiver of claim 2 wherein the controller uses the first timing offset for processing a sub-carrier whose corresponding metric does not exceed a threshold.

9. A controller for determining a timing offset for processing a multi-carrier signal comprising:
   an input coupled to the multi-carrier signal;

a correlator for processing each sub-carrier to determine a plurality of timing offsets, with one timing offset corresponding to each of a plurality of sub-carriers, the plurality of sub-carriers composing the multi-carrier signal and each sub-carrier also having a synchroniztion waveform and a message waveform; and a selector for selecting a first timing offset from the plurality of timing offsets for use in processing each of the plurality of sub-carriers;

wherein the controller determines the first timing offset corresponding to an average of a two or more timing offsets having a metric exceeding a threshold from the plurality of timing offsets.

10. The controller of claim 9 further comprising a metric calculator to determine a metric for each of the plurality of timing offsets to provide a plurality of metrics, where the metric corresponds to the accuracy of the timing offset.

11. The controller of claim 10 wherein the controller selects the first timing offset corresponding to a best metric from the plurality of metrics.

12. The controller of claim 10 wherein:

the correlator comprises a matched filter, a first multiplier for providing a magnitude squared of an output of the matched filter, a differentiator, and a zero crossing detector; and the metric calculator comprises a second multiplier, an accumulator, an amplifier, and a threshold comparator.

13. The controller of claim 12 wherein:

the magnitude squared of the output of the matched filter is provided to the threshold comparator and corresponds to a correlation value of the synchronization waveform and a known waveform; and the second multiplier, the accumulator and the amplifier provide an average energy of the synchronization waveform to the threshold comparator, wherein the threshold comparator comprises an analog output for providing the metric corresponding to the correlation value and the average energy of the synchronization waveform.

14. A method for estimating a timing offset in a multi-carrier signal comprising:

providing the multi-carrier signal, wherein the multi-carrier signal comprises a plurality of sub-carriers, each of the plurality of sub-carriers having a synchronization waveform and a message waveform;

determining a timing offset for each of the plurality of sub-carriers to provide a plurality of timing offsets;

selecting a first timing offset corresponding to the plurality of timing offsets; and processing the message waveform of each of the plurality of sub-carriers using the first timing offset;

wherein selecting the first timing offset further comprise:

determinging a quality metric for each timing offset to provide a plurality of quality metrics; and selecting the first timing offset corresponding to an average of two more timing offsets whose corresponding quality metric exceeds a threshold.

15. The method of claim 14 wherein selecting the first timing offset further comprises:

determining a quality metric for each timing offset to provide a plurality of quality metrics, selecting the first timing offset having the best quality metric.

16. The method of claim 14 further comprising:

storing the timing offset and the quality metric corresponding to each of the plurality of sub-carriers.

17. The method of claim 15 wherein the determining the timing offset further comprises:

correlating the synchronization waveform of each of the plurality of sub-carriers with a known waveform;

computing a function corresponding to a result of the correlating to give a correlation result;

differentiating the correlation result; and using a detector to give the timing offset.

18. The method of claim 17 wherein the determining the quality metric further comprises:

calculating a function corresponding to a set of samples of the synchronization waveform to give an energy total;

adjusting the energy total using a predetermined factor to give an adjusted result;

dividing the correlation result by the adjusted result to determine the quality metric.

* * * * *